Figure 2:
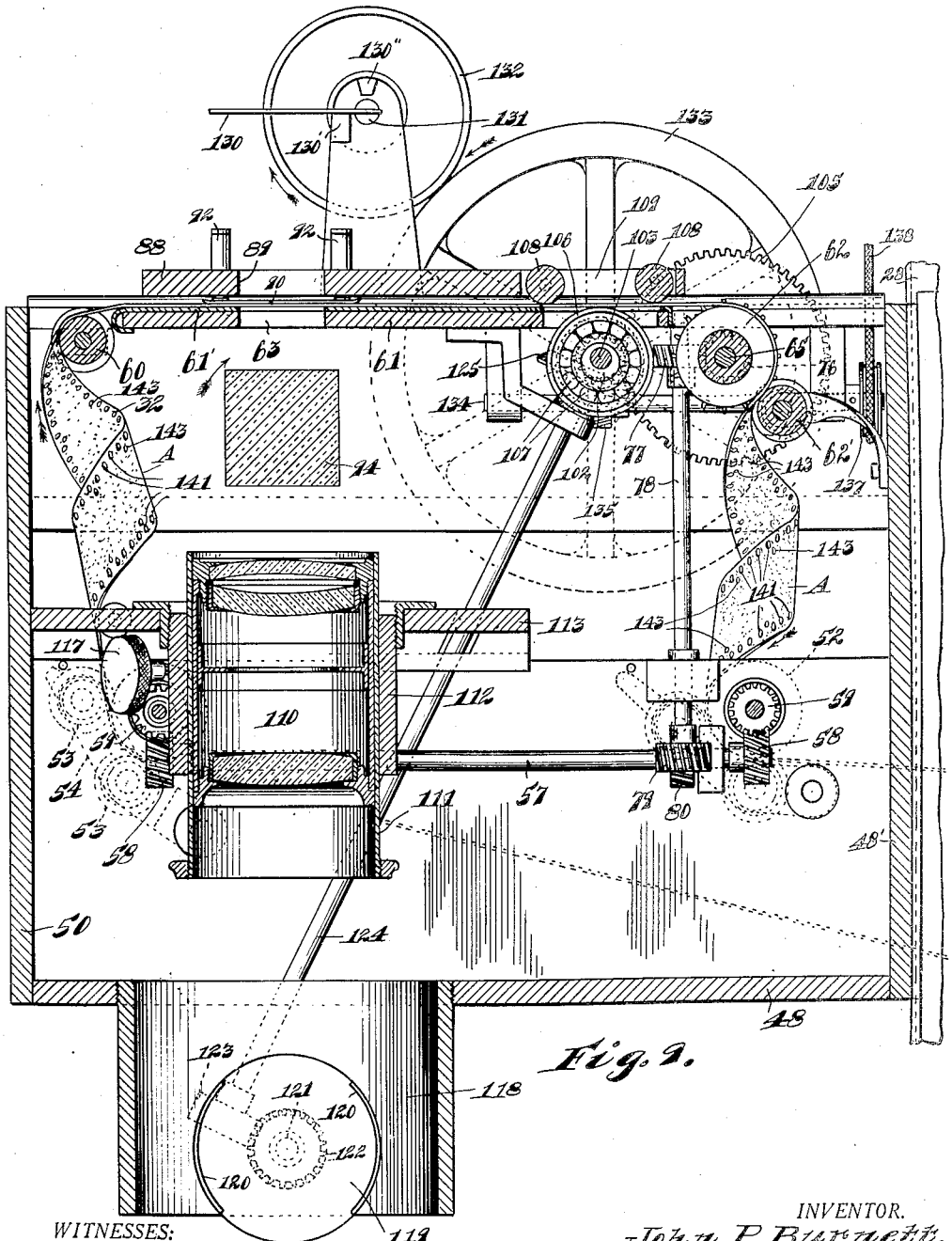

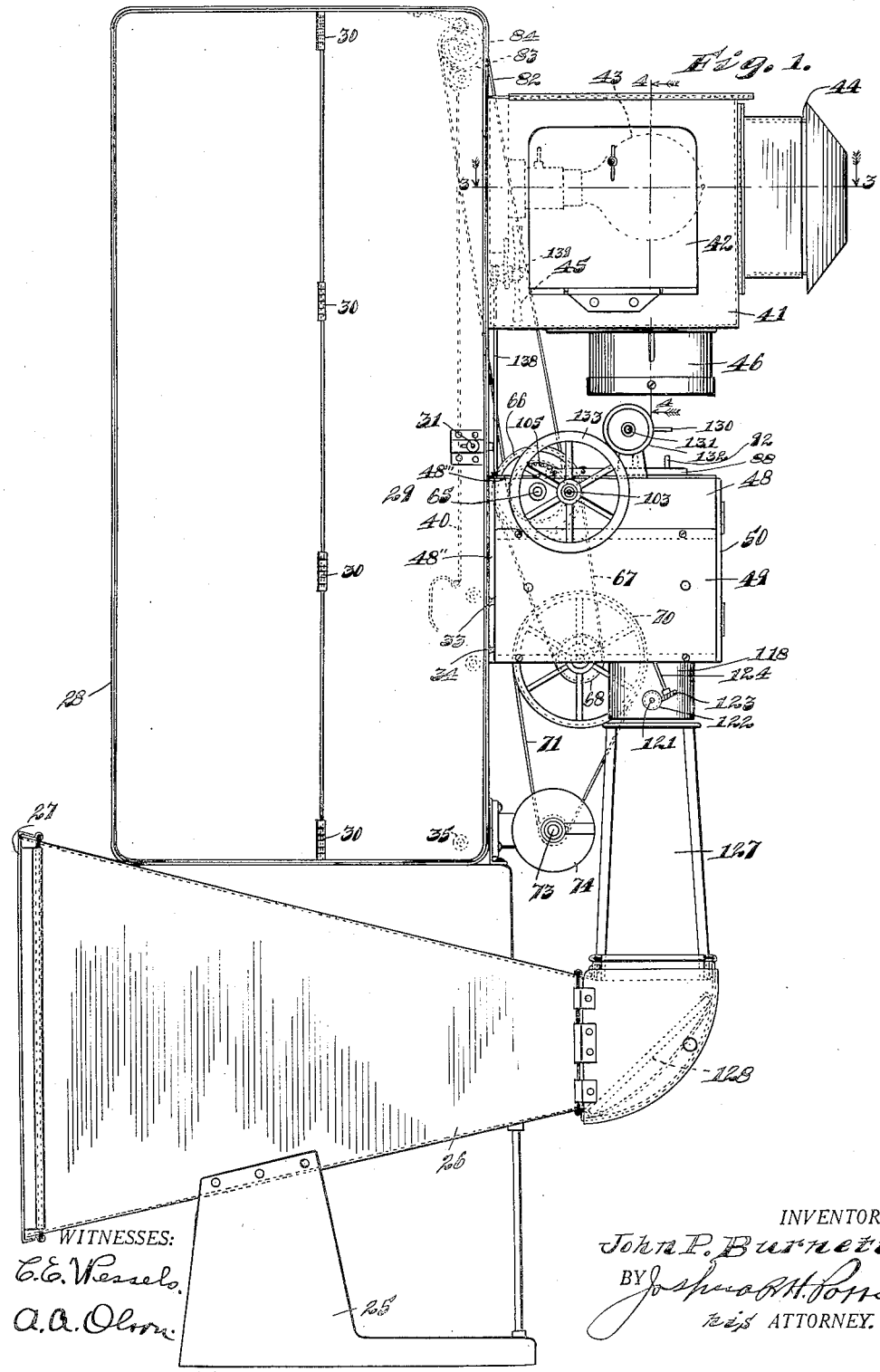

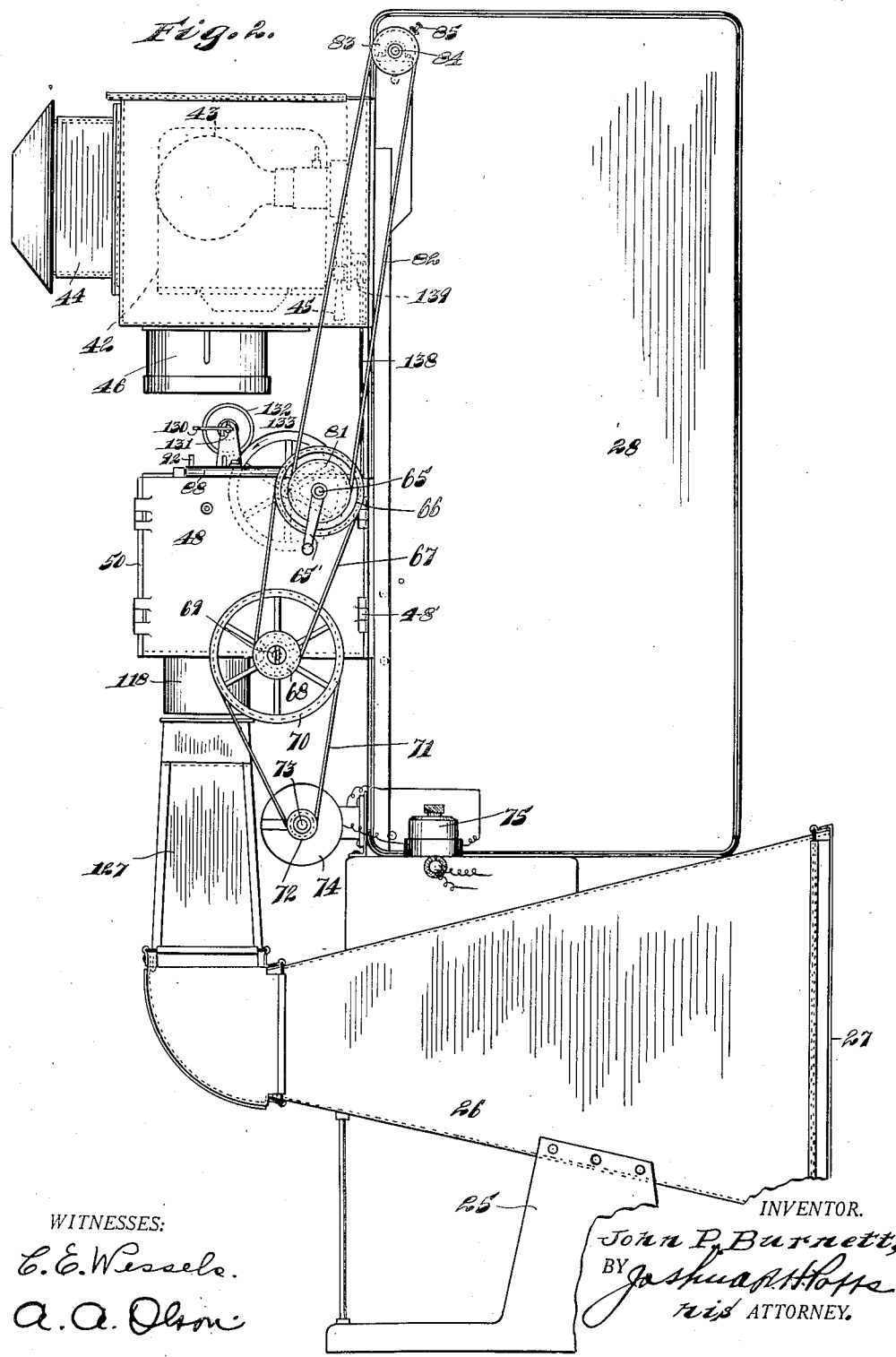

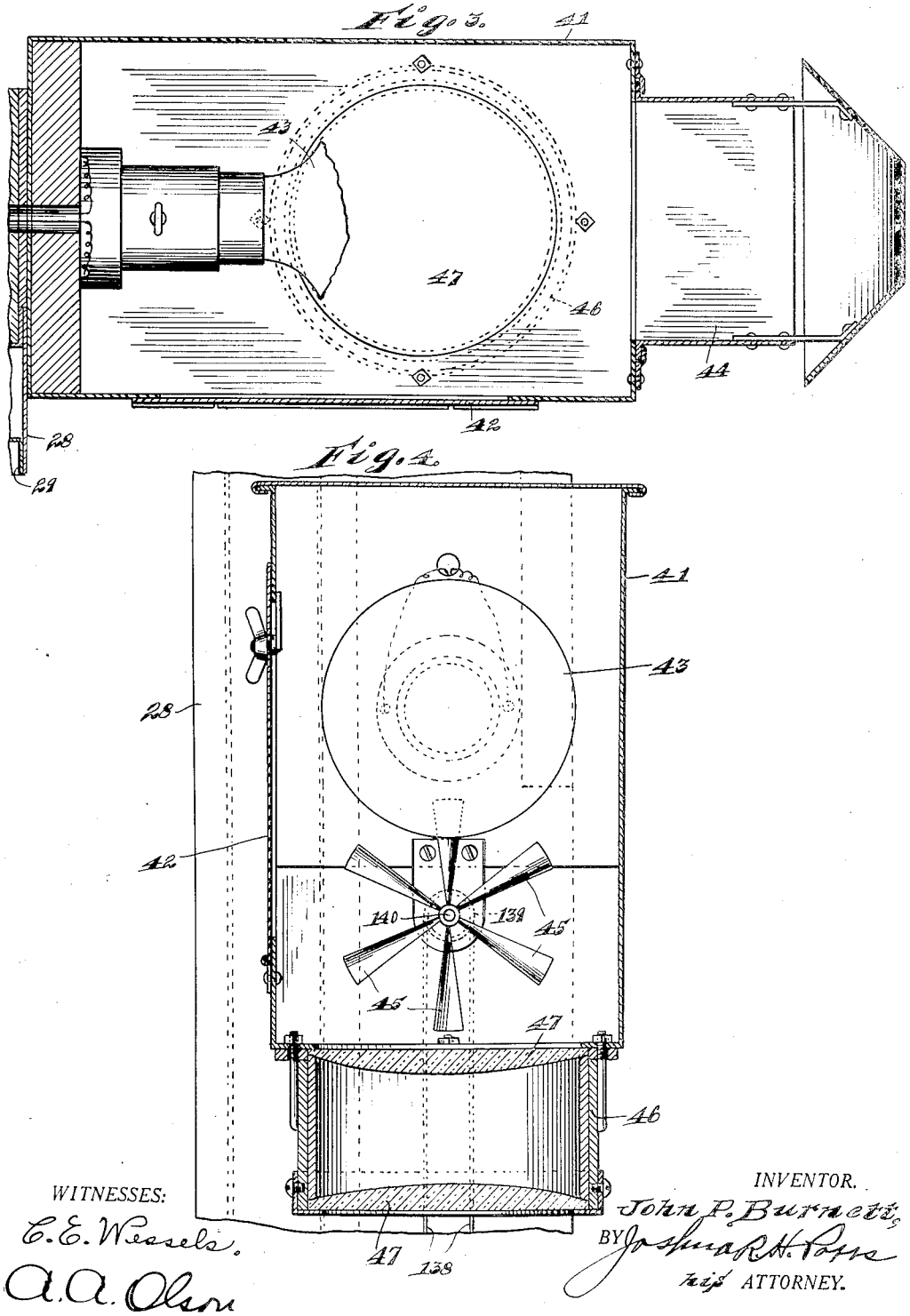

J. P. BURNETT.
MOTION PICTURE MACHINE.
APPLICATION FILED JAN. 8, 1917.
1,341,108.
Patented May 25, 1920.
10 SHEETS—SHEET 4.
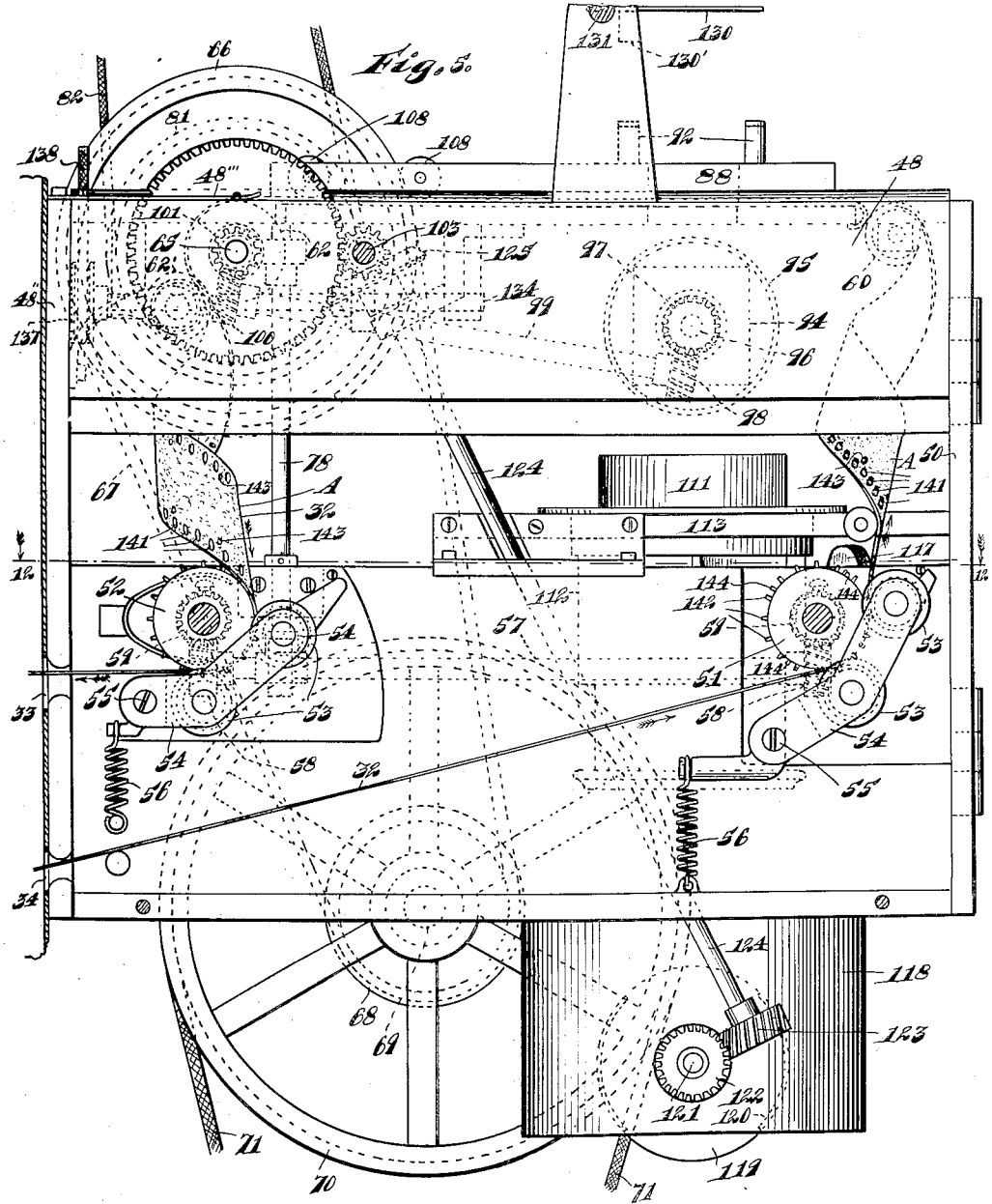
WITNESSES:
E. E. Wessels.
A. A. Olson
INVENTOR.
John P. Burnett,
BY Joshua R. H. Potts
his ATTORNEY.

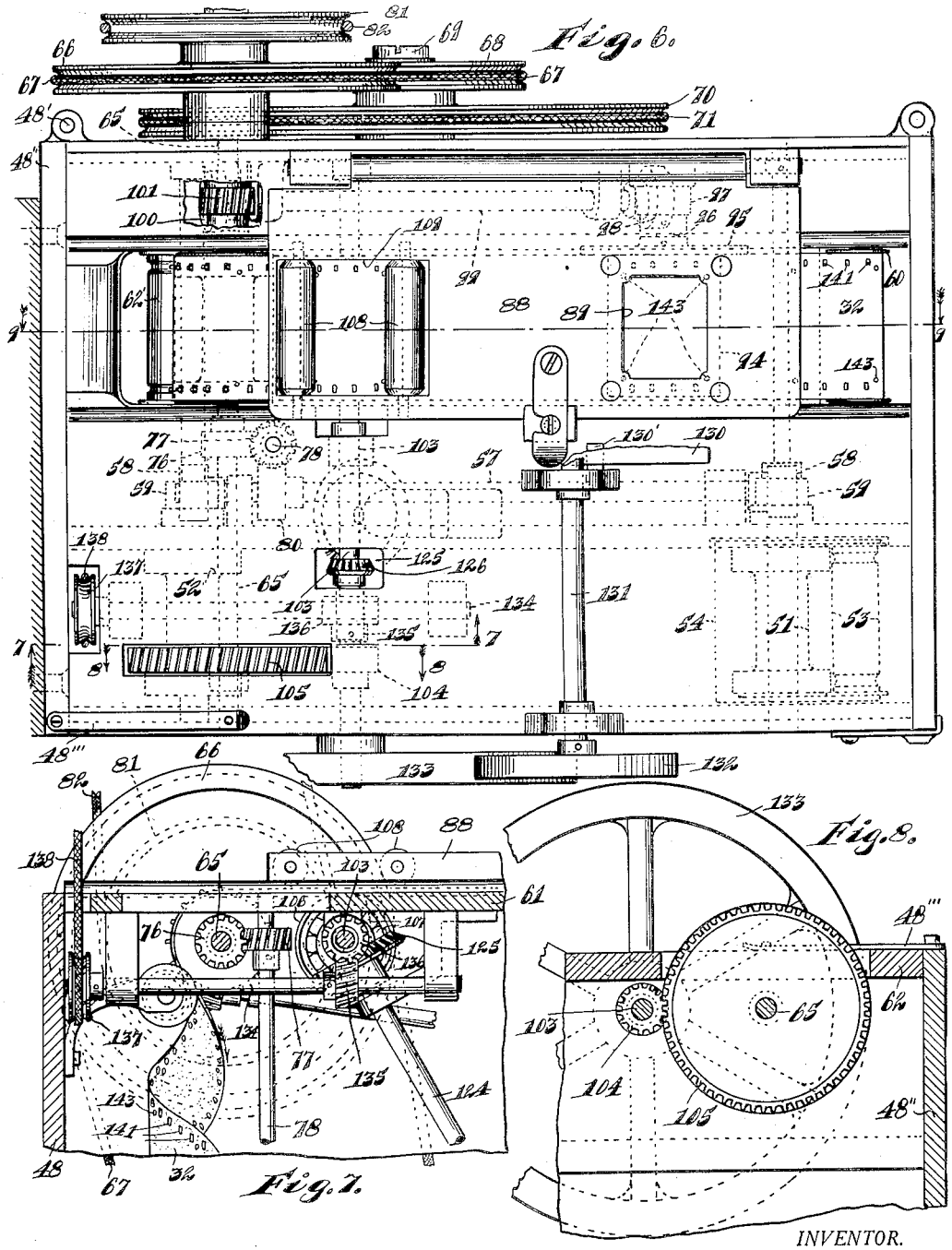

J. P. BURNETT.
MOTION PICTURE MACHINE.
APPLICATION FILED JAN. 8, 1917.

1,341,108.

Patented May 25, 1920.
10 SHEETS—SHEET 6.

WITNESSES:

INVENTOR.
John P. Burnett,
BY Joshua R. H. Potts
his ATTORNEY.

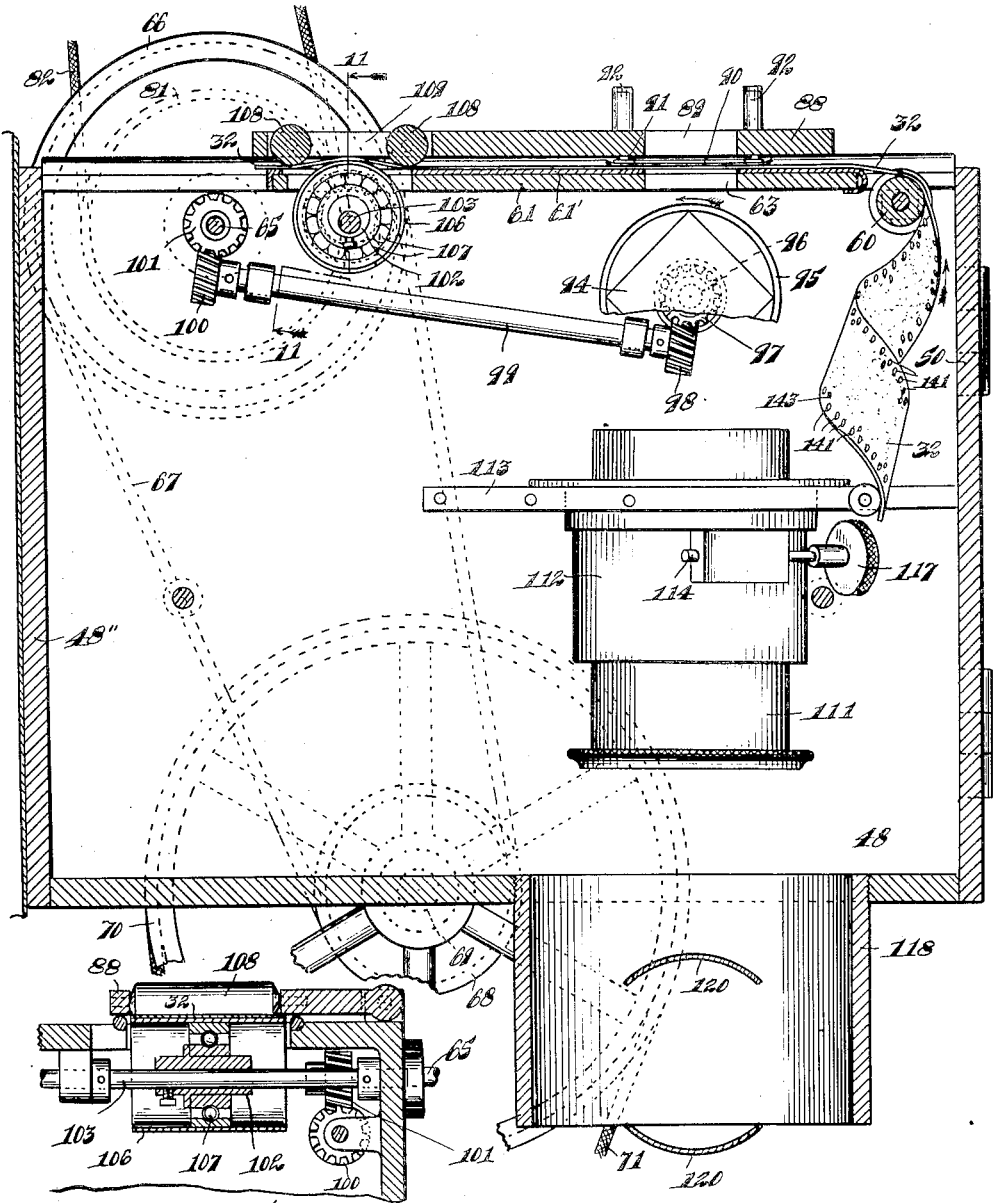

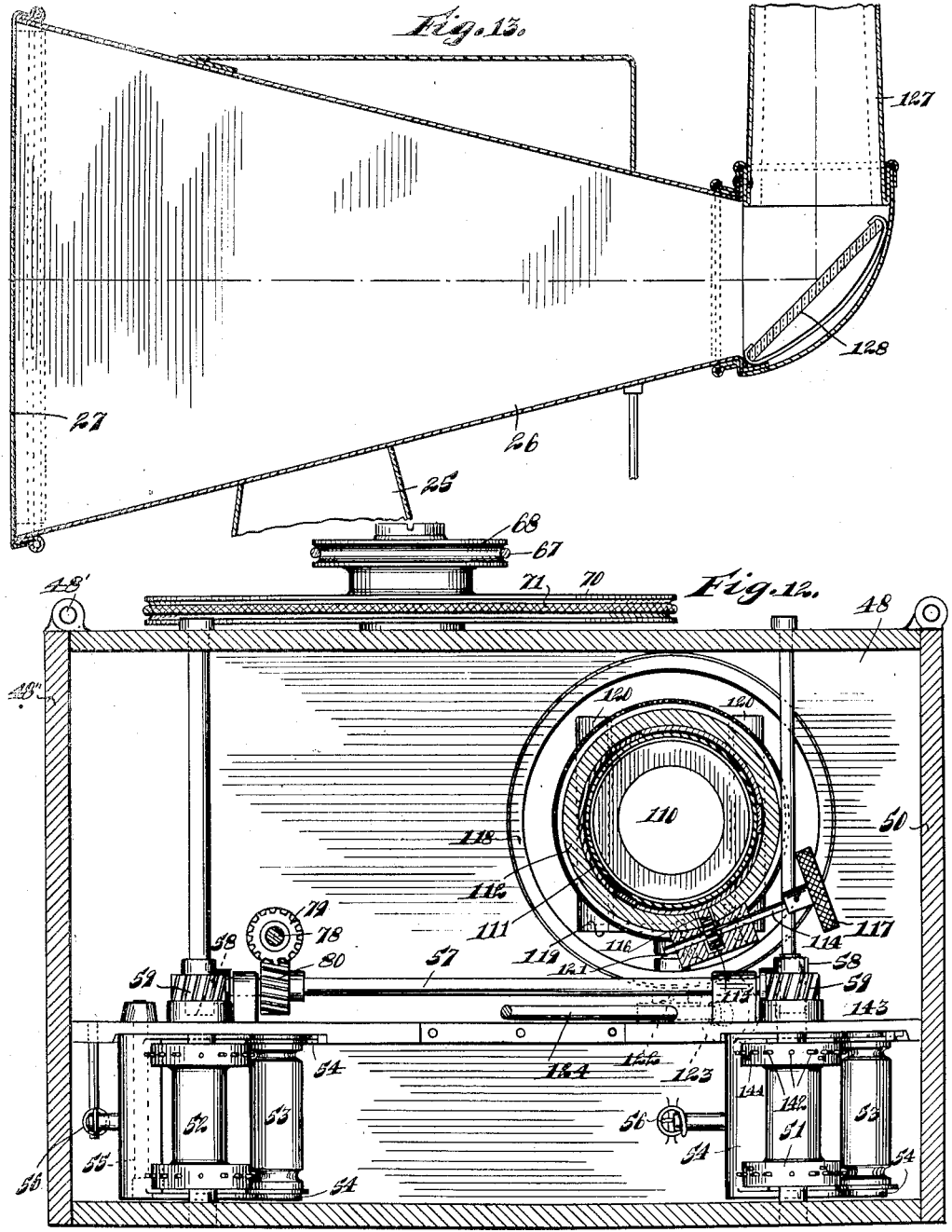

J. P. BURNETT.
MOTION PICTURE MACHINE.
APPLICATION FILED JAN. 8, 1917.
1,341,108.
Patented May 25, 1920.
10 SHEETS—SHEET 9.
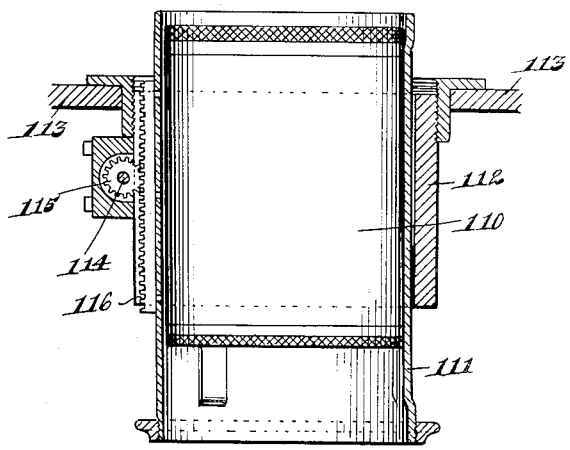
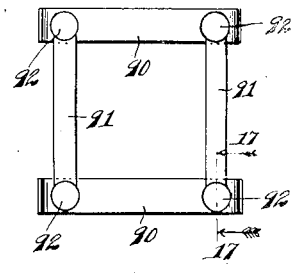
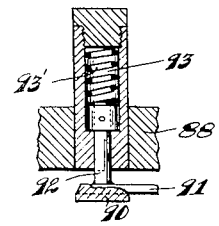
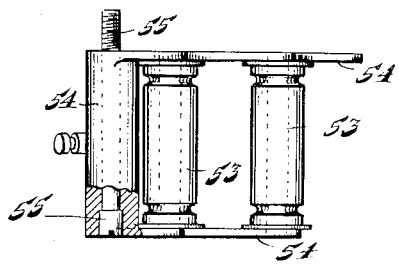
WITNESSES:
INVENTOR.
John P. Burnett,
BY
his ATTORNEY.

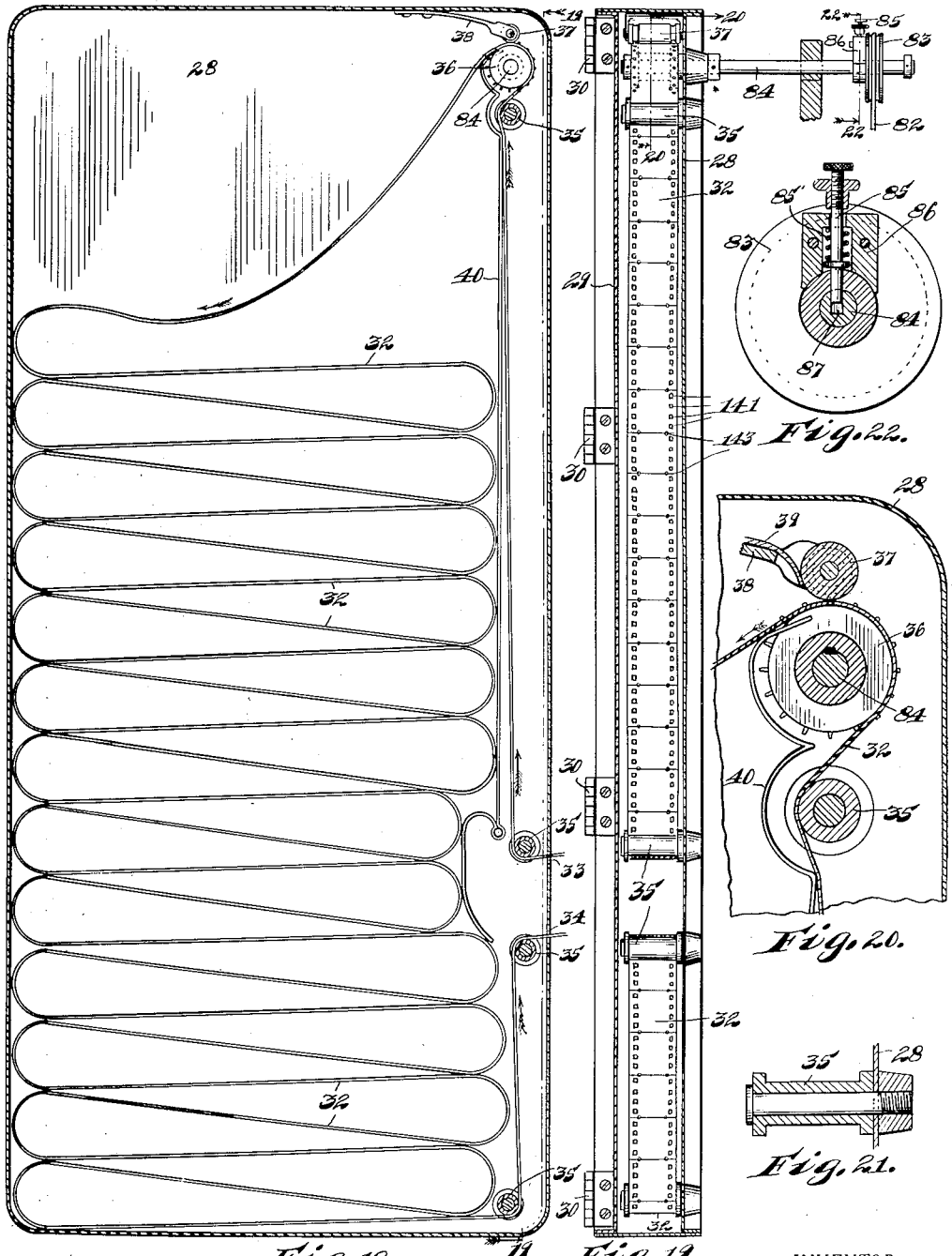

UNITED STATES PATENT OFFICE.

JOHN P. BURNETT, OF OAK PARK, ILLINOIS, ASSIGNOR TO AD-PHOTOSCOPE COMPANY, INC., OF CHICAGO, ILLINOIS, A CORPORATION OF DELAWARE.

MOTION-PICTURE MACHINE.

1,341,108.             Specification of Letters Patent.      Patented May 25, 1920.

Application filed January 8, 1917. Serial No. 141,271.

*To all whom it may concern:*

Be it known that I, JOHN P. BURNETT, a citizen of the United States, and a resident of Oak Park, county of Cook and State of Illinois, have invented certain new and useful Improvements in Motion-Picture Machines, of which the following is a specification.

My invention relates to improvements in motion picture machines, and has particular reference to motion picture projecting machines.

The object of my invention is the production of a motion picture projecting machine in which the film may be continuously moved, and yet a steady picture be produced upon the screen. In motion picture machines universally in use at the present time, the film is intermittently stopped, when the picture is shown, and moved for the change of pictures. This constant stopping and starting of the film at frequent intervals, results in severe wear upon the film, causing the same to wear out and become disabled in a short time, the life of a film, for this reason, being comparatively short. Through the production of a machine in which the film will be continuously moving, I aim to effect a great saving through the increased life of the film which will result from obviating the stopping of the film, as is now the case.

A further object is the production of a projecting machine which will be of comparatively simple construction, one which may be readily and easily operated and adjusted, and one which may be power driven for commercial purposes, avoiding the necessity of the employment of an operator.

Other objects will appear hereinafter.

With these objects in view, the invention consists in the combinations and arrangements of parts hereinafter described and claimed.

The invention will be best understood by reference to the accompanying drawings forming a part of this specification, and in which, Figures 1 and 2 are side elevations of a motion picture projecting machine embodying the invention, showing opposite sides of the machine, Figs. 3 and 4 are enlarged sections taken on substantially lines 3—3 and 4—4 respectively of Fig. 1, Fig. 5 is an enlarged detail sectional side elevation of the feeding and projecting portion of the construction, the side plate of the housing inclosing this mechanism being removed to expose underlying parts, Fig. 6 is a top plan view of the construction shown in Fig. 5, Fig. 7 is a detail section taken on line 7—7 of Fig. 6, Fig. 8 is a detail section taken along the same line but looking in the direction of the arrows 8—8, Fig. 9 is a section taken on substantially line 9—9 of Fig. 6, Fig. 10 is a substantially central vertical section through the construction shown in Fig. 5, the rotary lens embodied in this construction being, however, shown in intermediate or inoperative position, Fig. 11 is a section taken on substantially line 11—11 of Fig. 10, Fig. 12 is a section taken on substantially line 12—12 of Fig. 5, Fig. 13 is a vertical section through the lower portion of the light passage, Fig. 14 is a detail vertical section through the projecting lens of the machine, Fig. 15 is a sectional detail elevation of one of the devices employed for keeping the film in engagement with the sprocket rollers of the device, Fig. 16 is a detail plan view of the device employed for holding the film flat and straight at the exposure opening, Fig. 17 is an enlarged detail section taken on line 17—17 of Fig. 16, Fig. 18 is a vertical section through the film magazine, Fig. 19 is a section taken on substantially line 19—19 of Fig. 18, Fig. 20 is an enlarged detail section taken on substantially line 20—20 of Fig. 19, Fig. 21 is a sectional detail of one of the film guide rollers, and Fig. 22 is an enlarged detail section taken on line 22—22 of Fig. 19.

The preferred form of construction, as illustrated in the drawings comprises a base 25 upon which is mounted a rigidly secured and horizontally disposed flaring pipe or tube 26 forming a light passage. At the open front end of the member 26 is provided a screen 27 of ground glass, tracing cloth or other translucent material, onto which the pictures to be displayed are adapted to be projected in the operation of the machine.

Arranged above and rigidly secured to the member 26 is a vertically disposed substantially narrow film magazine or compartment 28 having a door 29 at one side hinged at 30, through which access may be gained to the interior of said magazine. A suitable lock 31 coöperates with said door for holding the same in closed position. The interior of magazine 28 is of a width corresponding substantially with that of the film 32 which the same is adapted to accommodate, an endless film being used which enters the magazine through an opening 33 at one side, leaving the magazine from the same side through an opening 34. In the passage of the film into and out of the magazine, the same is guided by rollers 35, said film, upon entering the magazine, passing upwardly, as clearly seen in Fig. 18, over a sprocket roller 36, the sprockets of which engage with the usual perforations in the longitudinal edges of the film for effecting feeding or movement of the latter. A roller 37 carried by a spring arm 38 presses the film down against the sprocket roller 36, insuring engagement of the film with said roller 36. A blade 39 coöperates with the roller 37, as clearly seen in Fig. 20, serving as a means of preventing sticking of the film to said roller 37, the arrangement being such, as will be seen, that in case the film adheres to the periphery of roller 37, the same will be loosened by the member 40, thus insuring the film being properly directed into the interior or main compartment of the magazine. The partition 40 prevents contact of the folds or convolutions of the film with the vertically traveling portion thereof above the inlet opening 33; and guards the inlet and outlet openings 33 and 34, as will be readily understood.

In the operation of the machine, the film entering the magazine will automatically fold itself within the magazine, as clearly shown in Fig. 18, the film being automatically removed from the lower end of the magazine, where the folds or convolutions will automatically unfold, as the film is drawn out. This arrangement, of course, permits of a considerable length of film being employed.

Rigidly mounted upon the rearward side of film magazine 28, adjacent the upper end thereof, is a lamp housing 41 having a hinged door 42 at one side, through which access may be gained to the interior of said housing. Mounted in the housing 41 is an electric lamp 43, or other suitable light-producing element, and at the rearward side of said housing is provided a ventilation opening 44, a fan 45 being arranged within housing 41, below the lamp 43, which fan is adapted to force the hot air generated in the lamp housing out through the ventilation opening 44. Arranged directly below the lamp 43, as clearly seen in Fig. 4, is a light passage 46 in which are mounted suitable lenses 47.

Also mounted upon the rearward side of film magazine 28, directly below the lamp housing 41, is the projecting and feeding mechanism of the machine comprising a substantially rectangular housing 48 having a removable side wall 49 and a hinged rear door 50, through which access may be readily gained to the interior of said housing. The housing 48 is hingedly secured as at 48' to a plate 48'' which is rigidly secured to the film magazine, as seen in Fig. 6. This permits of the housing being rocked outwardly, so as to allow for ready access to the interior of the same from the front side thereof, or that adjacent the plate 48''. A suitable catch or keeper 48''' is also provided to lock the housing 48 in operative position.

The film, after leaving the outlet opening 34 of the film magazine, enters the housing 48, as clearly seen in Fig. 5, passing around a sprocket roller 51, and said film, before entering the inlet opening 33 of the film magazine, passes around a similar sprocket roller 52, said rollers 51 and 52 being arranged at one side of the housing 48, or in a vertical plane to one side of the light rays which are projected through the machine from the lamp housing. In order to keep the film in engagement with the sprocket rollers 51 and 52, a holder is provided coöperating with each of said rollers which comprises a pair of spaced rollers 53 mounted in a frame 54 which is pivotally mounted at 55. A helical compression spring 56 coöperates with said frame in such a manner as to press the rollers 53 toward the roller 51 or 52, and with the result therefore of holding the film against said rollers 51 and 52. The rollers 51 and 52 are operatively connected so as to move in unison by means of a shaft 57 upon the ends of which are provided spiral gears 58 which mesh with spiral gears 59 provided upon the ends of the shafts of said rollers, as clearly shown in Fig. 9.

Mounted in the upper end of housing 48 is a roller 60 over which the film is adapted to pass after leaving the sprocket roller 51. After passing around the roller 60, the film passes over a horizontal plate 61 and thence around a sprocket roller 62 whence the same passes downwardly to the sprocket roller 52. With the sprocket roll 62 coöperates a roller 62' which serves to press the film into engagement with said sprocket roll 62, and thus prevent disengagement of the film from the teeth thereof. The plate 61 is provided with a rectangular opening 63 through which the rays of light are adapted to pass in the projection of the light through the film. In passing into registration with the exposure opening 63 the film is brought into vertical alinement with the rays of light projected from the lamp housing, and in order to laterally shift the film from the rollers 51 and 52 which, as before described are positioned in a plane to one side of the plane of the light rays, the film is twisted at points A intermediate the rollers 51 and 60, and 52 and 62, as clearly seen in Figs. 5 and 9.

The sprocket roller 62 is fixed to a shaft 65 mounted in suitable bearings in housing 48, said shaft 65 carrying at one end an exteriorly positioned channel pulley 66, as clearly shown in Figs. 2 and 6. The pulley 66 is engaged by an endless belt 67 which also passes around a channel pulley 68 on a countershaft 69. Also fixed to said counter shaft 69 is a channel pulley 70 around which travels an endless belt 71 which engages with a channel pulley 72 on the power shaft 73 of a suitable electric motor 74, through the medium of which the movable parts of the mechanism are driven. A switch 75 is interposed in the circuit of said motor for controlling the same, as will be readily understood. The shaft 65 is provided with a crank handle 65′ which permits of manual propulsion of the mechanism, if desired.

Upon the shaft 65 is also provided a spiral gear 76, as best seen in Figs. 6, 7 and 9, which gear meshes with a spiral gear 77 provided upon a vertical shaft 78. The lower end of shaft 78 is provided with a spiral gear 79 which meshes with a spiral gear 80 provided upon the shaft 57. Thus, the sprocket wheels 51 and 52 are driven. Driving of the sprocket wheel 36, which is located in the film magazine, is effected through the medium of a channel pulley 81, as seen in Fig. 2, which is provided upon the shaft 65. An endless belt 82 passes around pulley 81 and connects the same with a channel pulley 83, which is provided upon the shaft 84 of sprocket roller 36. The channel pulley 83 is releasably connected with the shaft 84 through the medium of a pin 85 which, as best seen in Figs. 19 and 22, is slidably mounted in a housing 86, provided upon one side of said pulley. Pin 85 projects through the hub of channel 83 for engagement with a socket or recess 87 provided in shaft 84, said pin being normally held in operative position, that is in engagement with said recess, by means of a helical compression spring 85′. Said pin projects exteriorly for manual engagement whereby the same may be pulled outwardly in order to release the pulley. When the pin is thus withdrawn, the pulley is slid longitudinally upon shaft 85 to carry the pin out of registration with recess 87, whereupon, upon operation of the mechanism, the pulley 83 will simply rotate idly upon shaft 84.

In the passage of the film 32 over the plate 61, said film passes under a plate 88 which is hingedly connected at one edge with the plate 61, the opposite edge being adapted for releasable locking to hold the same in operative position, as clearly shown in Figs. 6, 9 and 10. The plate 88 is formed with a rectangular opening 89 which registers with the opening 63 to permit of the passage of the light rays from the lamp housing, as above mentioned. In order to hold the film perfectly flat and straight, as the same passes into registration with the openings 63 and 89, so as to insure the best results upon the screen to which the pictures are projected, a holder or keeper is provided, as best seen in Figs. 9, 16 and 17. Said holder or keeper comprises a pair of spaced contact bars 90 which are adapted for engagement with the longitudinal edge portions of the film, the film, in passing over the plate 61 being pressed between the latter and said contact members 90, as will be readily understood. The members 90 are rigidly connected by cross bars 91 and at the ends thereof are provided with posts 92 which slidably engage, at their upper ends, with guides 93 secured in the plate 88, helical compression springs 93′ contacting with the upper ends of posts 92 being adapted to press the contact members 90 into engagement with the film, to insure the results desired. In order to avoid any friction and thus increase the life of the film, the plate 61 is preferably provided, at its upper side, with a covering 61′ of brass or other suitable material which will result in the least resistance or friction when the film is passed thereover.

Arranged in housing 48, directly under the opening 63, as clearly shown in Figs. 6, 9 and 10 is a lens 94 through which the light rays are required to pass after passage of the same through the film, as will be readily understood. The lens 94 is secured to a holder 95, the spindle or shaft 96 of which is rotatably mounted in suitable bearings provided in one side of housing 48. The spindle 96 is operatively connected with the shaft 65 through the medium of a spiral gear 97 fixed to said spindle, which gear meshes with a spiral gear 98 provided upon a shaft 99 which is also provided with a spiral gear 100 meshing with a spiral gear 101 provided upon shaft 65, as best seen in Figs. 5 and 10. The lens 94 is of rectangular or prismatic form, having a plurality of sides which are parallel with the axis of rotation of said lens, the diametrically opposite faces or sides of said lens being parallel. The arrangement and connection of the lens 94 is such that, in the operation of the machine, as the film is passed through the machine, the lens will be positioned with opposite sides horizontal or perpendicular to the light rays, as seen in Fig. 9, when a picture upon the film is in full registration with the exposure openings 63 and 89. As the film is fed along, the lens is rotated so that when the next picture reaches its proper position in registration with the exposure openings, the lens will have been rotated one-quarter of the way around, or through ninety degrees, or into a position corresponding with that above mentioned. In other words, in the operation of the machine, the film will be so fed and the lens will be so rotated that, as the successive pictures upon the film reach exposure position, the lens will always be in a position corresponding with that shown in Fig. 9, or with its upper and lower sides horizontal, or disposed perpendicularly with reference to the rays of light. With this arrangement then, the corners of the lens will traverse the light rays, or the lens will pass through its intermediate positions as shown in Fig. 10, as the division lines between successive pictures upon the film traverse the light rays. It has been found that with this arrangement, when the film is fed or moved continuously and the lens is rotated continuously, the two being, of course, operatively connected through the mechanism above described for synchronous operation or movement, the lens will serve to compensate for the movement of the film and thus result in the production of a steady or non-moving picture upon the screen which will be referred to as the description proceeds. It has been found, however, with a lens having four sides, as shown in the drawings, it is necessary to retard slightly the movement of the film as the pictures thereon approach and move from exposing position, and that it is also necessary to slightly accelerate the movement of the film as the same passes through the intermediate positions thereof, the acceleration gradually increasing until the lens reaches its medial or oblique position, as shown in Fig. 10, and gradually decreasing in its speed of movement as the film passes from this position and reaches the exposure position, as above mentioned. Such retardation and acceleration is accomplished through the medium of an eccentric 102 provided upon a shaft 103, as clearly seen in Figs. 9, 10 and 11, the shaft 103 being operatively connected with the shaft 65 by means of a pinion 104 provided upon the former which meshes with a gear 105 provided upon the latter, as seen in Fig. 6. Upon the eccentric 102 is mounted a rim or sleeve 106, a series of ball bearings 107 being interposed between said eccentric and rim to permit of free rotary movement of the latter. Said rim contacts with the film, as clearly seen in Fig. 9, the rotation of the eccentric being so timed as to effect upward movement or buckling of the film at the time of the retardation of the movement thereof and lowering of the film again at the time of acceleration in the movement thereof, the film being thus moved upwardly or buckled to effect retardation in the movement thereof as the lens 94 approaches and recedes from its operative position, or that shown in Fig. 9 and said film being lowered to effect acceleration in the movement thereof as the lens passes through its intermediate positions, or when the corners of the lens traverse the light rays, as seen in Fig. 10. Cooperating with said eccentric are two spaced rollers 108 arranged in an opening 109, which are adapted to engage with the film when the same is raised or buckled, as above mentioned.

Arranged below the lens 94 and through which the light rays pass after passage through said lens, is a projecting lens 110 of ordinary construction, the projecting lens 110 being mounted in a sleeve or holder 111 which is mounted for vertical adjustment, to permit of focusing, in a guide 112 which is secured in a shelf 113 arranged in housing 48. The projecting lens is adjusted vertically in the focusing operation by means of a shaft 114 upon which is carried a pinion 115 meshing with a rack 116 upon the holder 111, as clearly seen in Figs. 10, 12 and 14. The shaft 114 is provided with a knurled head 117 to permit of ready manual rotation or adjustment thereof. After passage of the light rays through the projecting lens 110, the same passes downwardly through the light passage 118 in which is arranged a shutter 119 carrying arcuate blades 120, as seen in Fig. 9. The shutter 119 is provided with a spindle 121 which is suitably rotatably mounted, said spindle being provided with a spiral gear 122 which meshes with a spiral gear 123 on an obliquely disposed shaft 124 which is provided at its upper end with a bevel gear 125 meshing with a bevel gear 126 on the shaft 103. Thus, an operative connection is established for effecting driving of the shutter. The arrangement is such that, in the operation of the machine, the light rays will be interrupted by the shutter blades in the intermediate positions of the lens 94, or in the movement of the film to present successive pictures for exposure. It has been found, however, that a shutter may be dispensed with, if desired, inasmuch as the light rays passing through the lens 94, during the movement of the latter wherein a corner of the lens traverses the light rays, are so diffused as to render unnoticeable the movement of the film or the change from one picture to the next. A clear picture is obtained only when the lens is approaching the position shown in Fig. 9 and as the same is retarding therefrom, in the intermediate positions of the lens the rays being so diffused that no image is discernible upon the screen.

After passing through the light passage 118, the light rays pass downwardly through passage 127, being thence reflected by an inclined mirror 128, as seen in Fig. 13, onto screen 27 which is provided at the front end of member 26, the images thus projected onto said screen being readily viewable from in front of the machine, as will be readily understood.

A safety device, such as is generally required by the fire underwriters, is provided to guard the film from the rays of light in case of stoppage of the machine. This safety device comprises a blade 130 carried by a shaft 131 on which is also provided a friction wheel 132 adapted for frictional engagement with a friction wheel 133 which is provided at one end of shaft 103, as clearly seen in Figs. 6 and 9. The blade 130 is adapted for oscillatory movement, such movement being limited by stops 130' and 130''. The frictional engagement between the wheels 132 and 133 is such that, when the machine is in operation, that is when the wheel 133 is rotating, the contact of the same with the wheel 132 will cause the blade 130 to be raised to substantially vertical position in order to permit of the uninterrupted passage of the light rays. Upon cessation of operation of the machine, however, the weight of the blade 130 will overcome the frictional resistance of the wheel 133 and cause said blade to rock to horizontal position, as seen in Fig. 9, in which position of said blade the light rays will be interrupted and thus prevented from reaching the film.

Driving of the fan 45, provided in the lamp housing to effect removal of the hot air therefrom, is effected by means of a shaft 134 arranged in housing 48, as best seen in Fig. 7. The shaft 134 carries a spiral gear 135 which meshes with a spiral gear 136 on the shaft 103. Upon the shaft 134 is also provided a channel pulley 137 which is connected by means of an endless belt 138 with a channel pulley 139 provided upon the shaft 140 of fan 45, as best seen in Fig. 4.

In order to insure positive feeding of the film and also to guard against imitators, the film is preferably provided at each longitudinal edge portion thereof in addition to the usual row of perforations 141, with which engage the sprocket teeth 142 of the sprocket rollers of the device, with another row of perforations 143, with which engage additional sprocket teeth 144 provided upon sprocket roller 52, as seen in Fig. 12.

While I have illustrated and described the preferred form of construction for carrying my invention into effect, this is capable of variation and modification without departing from the spirit of the invention. I, therefore, do not wish to be limited to the precise details of constructions set forth, but desire to avail myself of such variations and modifications as come within the scope of the appended claims.

Having described my invention what I claim as new and desire to secure by Letters Patent is:

1. In a motion picture projecting machine, the combination of an endless movable film; a housing through which the film is adapted to be fed in the projection thereof; a source of illumination arranged above said housing and adapted to project light downwardly through the film passing through said housing; a light passage extending downwardly and horizontally from said housing; a translucent screen at the front end of said passage; a mirror for reflecting the light from said source of illumination onto said screen; and a film magazine arranged above the horizontal portion of said light passage and forwardly of said housing and source of illumination, substantially as described.

2. In a motion picture projecting machine, the combination of a source of illumination; an endless movable film; means for allowing the projection of light from said source of illumination through said film; a perpendicularly extending passage adapted to receive the light after passage through said film; a mirror for reflecting said light horizontally of said light passage; and a translucent screen onto which the light is projected from said mirror substantially as described.

3. In a motion picture machine, the combination of a source of illumination; an endless movable film; means for allowing the projection of light from said source of illumination through said film; a perpendicularly extending passage adapted to receive said light after passage through said film; a light passage extending horizontally from the lower end of said perpendicularly extending passage; and a translucent screen at the front end of said horizontally extending light passage substantially as described.

4. In a motion picture machine, the combination of a source of illumination; an endless movable film; means for allowing the projection of light from said source of illumination through said film; a perpendicularly extending passage adapted to receive said light after passage through said film; a light passage extending horizontally from the lower end of said perpendicularly extending passage; means for reflecting the light from said perpendicularly extending passage through said horizontally extending passage; and a translucent screen at the front end of said horizontally extending light passage substantially as described.

In testimony whereof I have signed my name to this specification in the presence of two subscribing witnesses.

JOHN P. BURNETT.

Witnesses:
JOSHUA R. H. POTTS,
HELEN F. LILLIS.